United States Patent [19]
Keating et al.

[11] Patent Number: 5,162,907
[45] Date of Patent: Nov. 10, 1992

[54] MOTION DEPENDENT VIDEO SIGNAL PROCESSING

[75] Inventors: Stephen M. Keating, Lower Earley; Sally J. Griffiths, Hook, both of United Kingdom

[73] Assignee: Sony Broadcast & Communications Limited, Basingstoke, United Kingdom

[21] Appl. No.: 761,647

[22] Filed: Sep. 18, 1991

[30] Foreign Application Priority Data

Sep. 28, 1990 [GB] United Kingdom ............... 9021154

[51] Int. Cl.$^5$ .................. H04N 7/01; H04N 11/20
[52] U.S. Cl. ............................ 358/105; 358/11; 358/140
[58] Field of Search ............ 358/105, 140, 11

[56] References Cited

U.S. PATENT DOCUMENTS 4,891,701 1/1990 Shikina .......................... 358/140
5,027,203 6/1991 Samad ........................... 358/140

Primary Examiner—Howard W. Britton
Attorney, Agent, or Firm—Alvin Sinderbrand; William S. Frommer

[57] ABSTRACT

A motion compensated video standards converter comprises a block matcher (3) for deriving a plurality of motion vectors for each pixel of each field or frame of an output standards-converted video signal, the motion vectors representing motion between successive fields or frames of an input video signal from which the output video signal is to be derived by motion compensated interpolation, a circuit (25) for testing each said motion vector by deriving the sum of absolute luminance differences of corresponding pixels in blocks of pixels in the two fields or frames of said input video signal temporarily nearest a field or frame of said output video signal, which blocks are pointed to by the motion vector under test, a circuit (26 to 28) for center-weighting said sum of absolute luminance differences if the magnitude of said motion vector under test is less than a predetermined value, and a selector (29) for selecting from said plurality of motion vectors, the motion vector which results in the minimum said sum of absolute luminance differences.

16 Claims, 14 Drawing Sheets

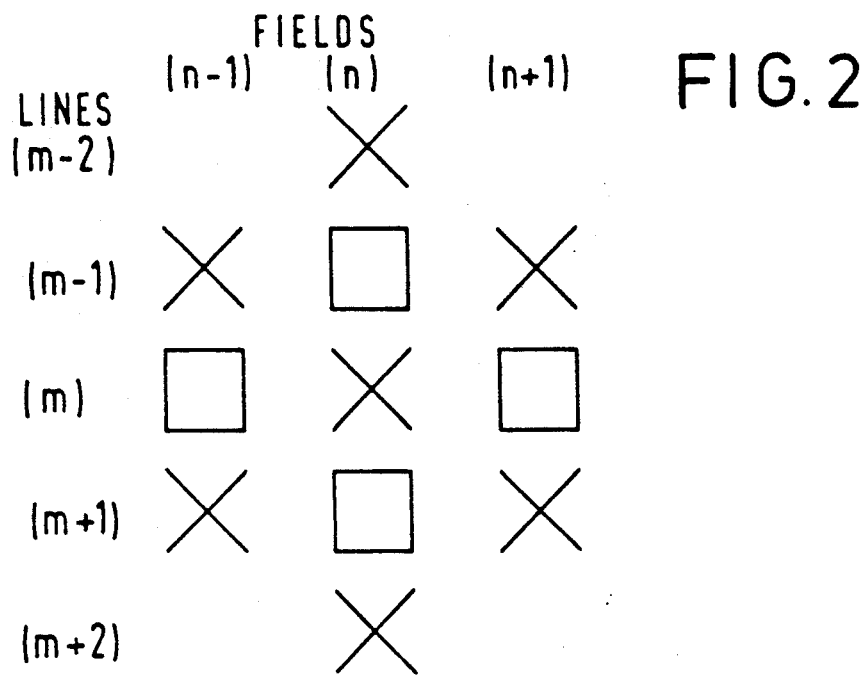
FIG. 2
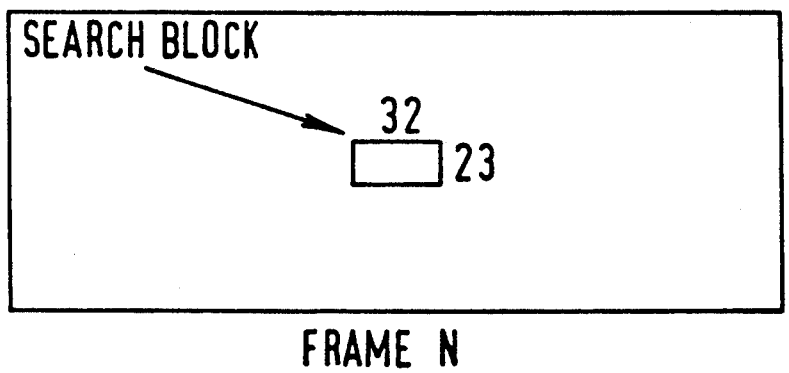
FIG. 4
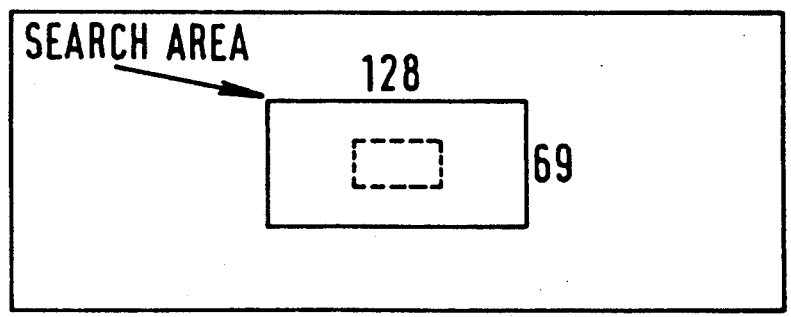

REGION A

MOTION DEPENDENT VIDEO SIGNAL PROCESSING

BACKGROUND OF THE INVENTION

1. Field of the Invention

This invention relates to motion dependent video signal processing. More particularly, the invention relates to methods of deriving motion vectors representing motion between fields or frames of a video signal, and to video standards converters using such methods. Still more particularly, but not exclusively, the invention relates to the type of video standards converter generally known as and referred to herein as a down converter.

2. Description of the prior Art

Video standards converters are well known devices used to convert video signals from one standard to another, for example, from a 625 lines per frame, 50 fields per second standard to a 525 lines per frame, 60 fields per second standard. Video standards conversion cannot be achieved satisfactorily merely by using simple linear interpolation techniques, because of the temporal and vertical alias which is present in a video signal. Thus, simple linear interpolation produces unwanted artifacts in the resulting picture, in particular, the pictures are blurred vertically and judder temporally.

To reduce these problems it has been proposed that video standards converters should use adaptive techniques to switch the parameters of a linear interpolator in dependence on the degree of movement in the picture represented by the incoming video signal.

It has also been proposed, for example for the purpose of data reduction in video signal processing, to generate motion vectors from an incoming video signal by a block matching technique, in which the content of a search block in one field or frame is compared with the respective contents of a plurality of search blocks comprised in a search area in the following field or frame, to determine the minimum difference between the contents so compared, and hence the direction and distance of motion (if any) of the content of the original search block.

Our copending European patent specification EP-A2-0 395 275 (published Oct. 31, 1990) discloses a method of deriving motion vectors representing motion between successive fields or frames of a video signal, and in particular a method of selecting motion vectors appropriate to each pixel of an output field or frame. These applications also disclose a video standards converter using such methods, and particularly, but not exclusively, intended for use in the conversion of a high definition video signal (HDVS) having 1125 lines per frame, 60 fields per second, to 24 frames per second 35 mm film. The present invention is particularly concerned with modifying the algorithms used in the motion vector selection such that the amount of hardware required can be reduced, and also with widening the range of video standards converters in which the methods can be used to include down converters operable in real time.

SUMMARY OF THE INVENTION

One object of the present invention is to provide an improved method of deriving motion vectors.

Another object of the present invention is to provide an improved method of deriving motion vectors appropriate to each pixel of an output field or frame.

Another object of the present invention is to provide an improved motion compensated video standards converter.

Another object of the present invention is to provide a down converter operable in real time.

According to the present invention there is provided a method of deriving motion vectors representing motion between successive fields or frames of an input video signal from which a standards-converted output video signal is to be derived by motion compensated interpolation, the method including the steps of:

deriving a plurality of motion vectors for each pixel of each field or frame of said output video signal;

testing each said motion vector by deriving the sum of absolute luminance differences of corresponding pixels in blocks of pixels in the two fields or frames of said input video signal temporally nearest a field or frame of said output video signal, which blocks are pointed to by the motion vector under test;

centre-weighting said sum of absolute luminance differences if the magnitude of said motion vector under test is less than a predetermined value; and selecting from said plurality of motion vectors, the motion vector which results in the minimum said sum of absolute luminance differences.

According to the present invention there is also provided a motion compensated video standards converter comprising:

means for deriving a plurality of motion vectors for each pixel of each field or frame of an output standards-converted video signal, said motion vectors representing motion between successive fields or frames of an input video signal from which said output video signal is to be derived by motion compensated interpolation;

means for testing each said motion vector by deriving the sum of absolute luminance differences of corresponding pixels in blocks of pixels in the two fields or frames of said input video signal temporally nearest a field or frame of said output video signal, which blocks are pointed to by the motion vector under test; means for centre-weighting said sum of absolute luminance differences if the magnitude of said motion vector under test is less than a predetermined value; and means for selecting from said plurality of motion vectors, the motion vector which results in the minimum said sum of absolute luminance differences.

The above, and other objects, features and advantages of this invention will be apparent from the following detailed description of illustrative embodiments which is to be read in connection with the accompanying drawings.

BRIEF DESCRIPTION OF THE DRAWINGS

FIG. 2 shows diagrammatically progressive scan conversion;

FIGS. 4 and 5 show diagrammatically search blocks and search areas, and the relationships therebetween;

DESCRIPTION OF THE PREFERRED EMBODIMENTS

The embodiment of motion compensated video standards converter to be described is particularly intended for use as a down converter for converting a high definition video signal (HDVS) having 1125 lines per frame and 60 fields per second, to a standard PAL television signal having 625 lines per frame and 50 fields per second. However, it will be understood that the invention is not limited in this respect, and that the standards converter can readily be adapted to effect conversions between other standards.

Figure 1:
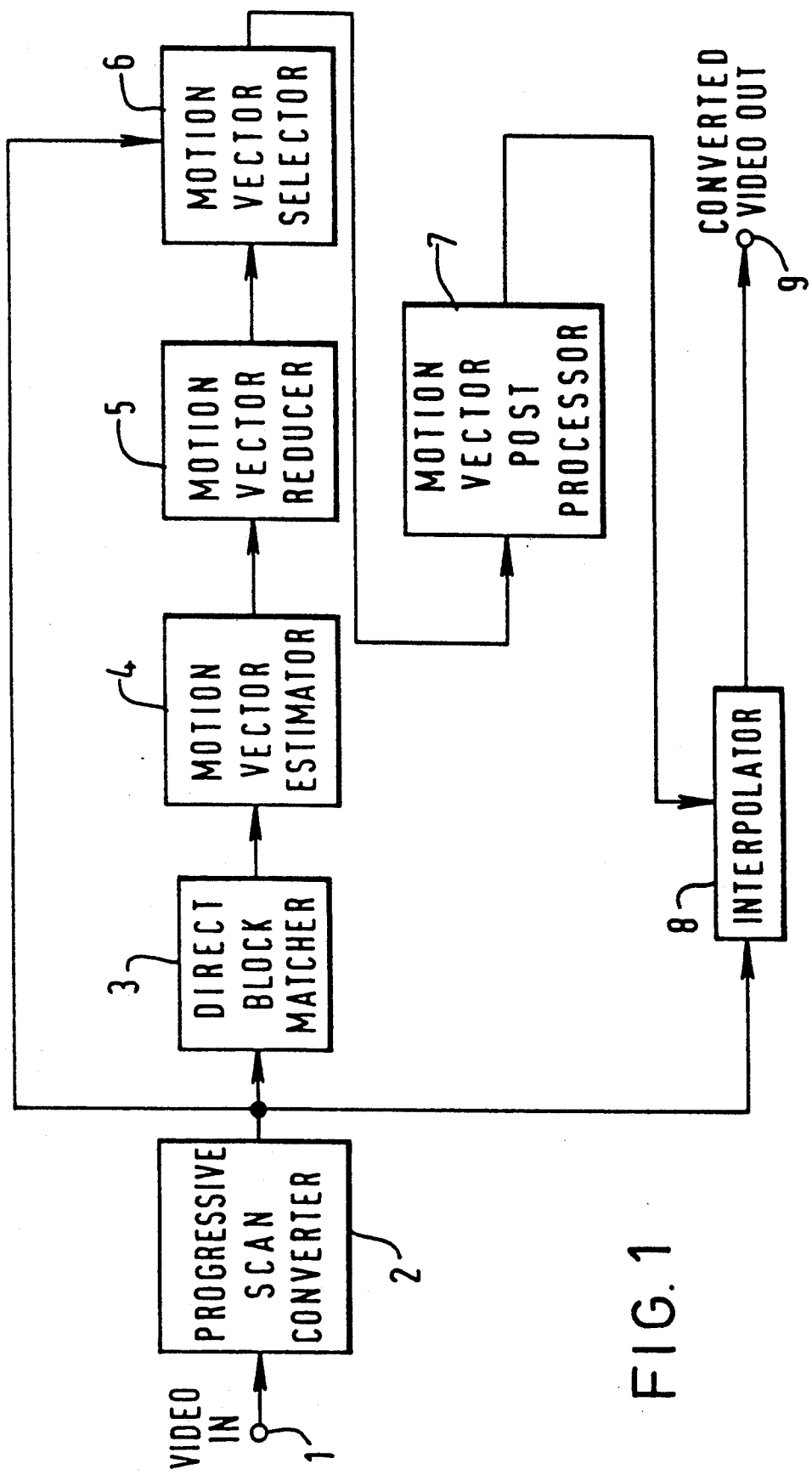
FIG. 1 is a block diagram of an embodiment of motion compensated video standards converter according to the present invention.

FIG. 1 is a block diagram of the standards converter. The standards converter comprises an input terminal 1 to which an input video signal is supplied. The input terminal 1 is connected to a progressive scan converter 2 in which the input video fields are converted into video frames which are supplied to a direct block matcher 3 wherein correlation surfaces are created. These correlation surfaces are analyzed by a motion vector estimator 4, which derives and supplies motion vectors to a motion vector reducer 5, wherein the number of motion vectors for each pixel is reduced, before they are supplied to a motion vector selector 6, which also receives an output from the progressive scan converter 2. Any irregularity in the selection of the motion vectors by the motion vector selector 6 is removed by a motion vector post processor 7, from which the processed motion vectors are supplied to and control an interpolator 8 which also receives an input from the progressive scan converter 2. The output of the interpolator 8, which is a standards-converted and motion-compensated video signal is supplied to an output terminal 9. Each part of the standards converter and the operation thereof will be described in more detail below.

The progressive scan converter 2 produces output frames at the same rate as the input fields. Thus, referring to FIG. 2 which shows a sequence of consecutive lines in a sequence of consecutive fields, the crosses representing lines present in the input fields and the squares representing interpolated lines, each output frame will contain twice the number of lines as an input field, the lines alternating between lines from the input video signal and lines which have been interpolated by one of the methods to be described below. The interpolated lines can be regarded as an interpolated field of the opposite polarity to the input field, but in the same temporal position.

Progressive scan conversion is preferably carried out, for two main reasons; firstly, to make the following direct block matching process easier, and secondly in consideration of the final output video format. Concerning block matching, this is used to obtain an accurate estimation of the horizontal and vertical motion between two successive video fields, as described in more detail below. However, if an interlaced video signal is used for direct block matching, problems can arise.

Concerning consideration of the final output video format, the progressive scan converted frames can be used as a fall-back in the case where motion compensated standards conversion is deemed to be producing unacceptable results, for example, where the motion is too diverse to be analyzed satisfactorily or at a scene change. In that case the use of the nearest progressive scan converted frame as the required output frame can produce reasonably acceptable results.

Figure 3:
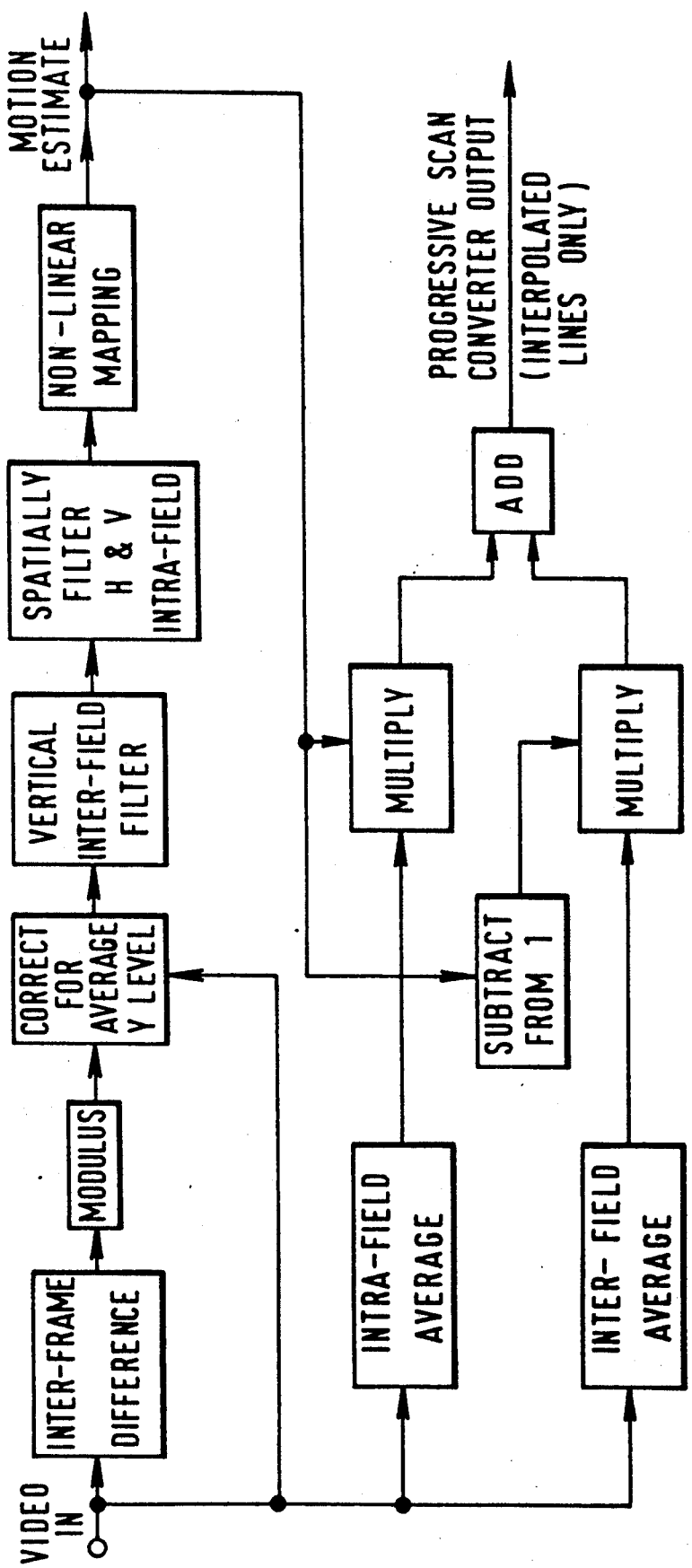
FIG. 3 is a block diagram showing the steps in motion adaptive progressive scan conversion.

Progressive scan conversion can be carried out in a number of ways, such as by previous field replacement, median filtering in which three spatially consecutive lines are examined (temporally these three lines will come from two consecutive fields), or a motion compensated technique which utilizes multi-gradient motion detection followed by multi-direction linear interpolation. However, in the present embodiment the preferred method is motion adaptive progressive scan conversion, the steps of which are indicated in the block diagram of FIG. 3. The concept is to use inter-field interpolation in wholly static picture areas to retain as much vertical information as possible, and to use intra-field interpolation when significant motion is present. This also aids smooth portrayal of motion. In scenes where the motion is somewhere between these two extremes, an estimate of the local motion present in the picture is made, and this is then used to mix together different proportions of inter- and intra-field interpolation. This is described in more detail in the above-mentioned patent specification.

Referring back to FIG. 1, the frames of video derived by the progressive scan converter 2 are used to derive motion vectors. The estimation of motion vectors consists of two steps. Firstly, correlation surfaces are generated by correlating search blocks from consecutive frames. Then, having obtained these correlation surfaces, they have to be examined to determine the position or positions at which correlation is best. Several different methods of obtaining a correlation surface exist, and in the present case the method used is direct block matching.

The direct block matcher 3 operates as follows. Two blocks, respectively comprising a rectangular array of pixels from consecutive frames of the progressive scan converted video signal are correlated to produce a correlation surface from which a motion vector is derived.

Figure 5:
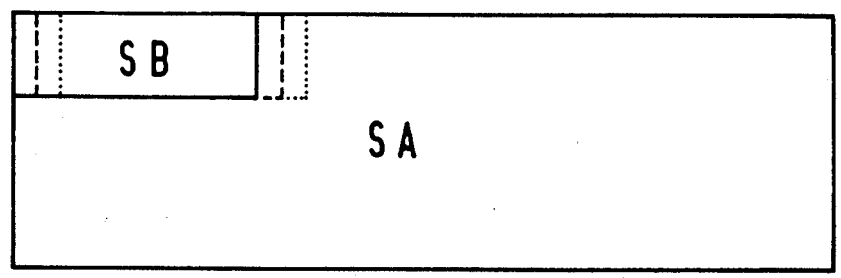
Figure 6:
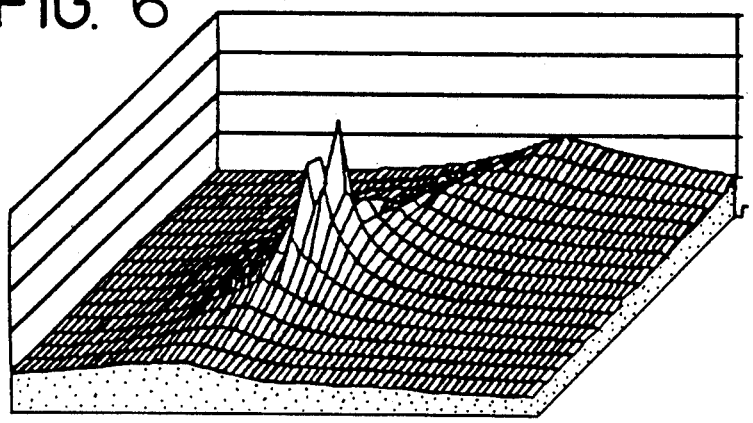
FIG. 6 shows a correlation surface.

Referring to FIG. 4, firstly a small block called a search block of size 32 pixels by 23 lines is taken from a frame as shown in FIG. 4. Then a larger block called a search area of size 128 pixels by 69 lines is taken from the next frame. The search block (SB) is then placed in each possible position in the search area (SA) as shown in FIG. 5, and for each location the sum of the absolute difference of pixel luminance levels between the two blocks is calculated. This value is then used as the height of the correlation surface at the point at which it was derived. It can then be used in conjunction with other similarly derived values for each possible location of the search block in the search area to obtain a correlation surface, an example of which is shown in FIG. 6. For clarity the surface is shown inverted, and as it is in fact the minimum that is required, the required point in FIG. 6 is the main peak.

The size of the search block is selected by examining the minimum size of an object that may require motion compensation. For PAL 625 lines per frame, 50 fields per second signals a search block of 16 pixels by 8 lines has been found suitable for tracking a small object without allowing any surrounding information not within the object, but still within the search block, to affect the tracking of the object. This approach has therefore been adopted in the present embodiment, but modified to take account of the different numbers of active pixels per line, active lines per frame, and aspect ratio of a HDVS as compared with PAL 625/50. The comparative figures, the HDVS being put first, are as follows; 1920 (720) active pixels per line, 1035 (575) active lines per frame, 9:16 (3:4) aspect ratio.

It should be added that there is an argument for using a larger search block, since this means that a large object can be tracked. On the other hand, there exists an argument for using a smaller search block, to prevent a small object being over-shadowed by the effect of a large object or background area. Also, however, there is the advantage that with small search blocks there is no requirement for the derivation of more than one motion vector from each of them. Because having a single motion vector is so much easier than having more than one, the present embodiment starts with a small search block as described above, and then causes the search block to grow into a bigger search block if no satisfactory result has been obtained. This then encompasses the advantages of both a small and a large search block. The criteria for a satisfactory result is set by the motion vector estimator 4 (FIG. 1) referred to in more detail below and which determines the motion vector from a given correlation surface.

This technique of causing the search block to grow is not only advantageous for tracking large objects. It can also help to track the movement of an object having the shape of a regular pattern of a periodic nature.

The search block, and the search area, can both be grown horizontally or vertically, or indeed in both directions, if the correlation surface suggests it.

From the correlation surface (FIG. 6) generated for each search block in a frame the motion vector estimator 4 (FIG. 1) deduces the likely inter-frame motion between the search block and its corresponding search area. It should again be mentioned that for clarity all diagrams of correlation surfaces are shown inverted, that is, such that a minimum is shown as a peak.

The motion vector estimator 4 (FIG. 1) uses motion vector estimation algorithms to detect the minimum point on each correlation surface. This represents the point of maximum correlation between the search block and the search area, and hence indicates the probable motion between them. The displacement of this minimum on the correlation surface with respect to the origin, in this case the centre of the surface, is a direct measurement, in terms of pixels per frame, of the motion. For the simplest case, where the correlation surface contains a single, distinct minimum, the detection of the minimum point on the correlation surface is sufficient to determine accurately the motion between the search block and the search area. As previously mentioned, the use of small search blocks improves the detection of motion and the accuracy of motion estimation, but unfortunately small single search blocks are unable to detect motion in a number of circumstances which will now be described.

Figure 7:
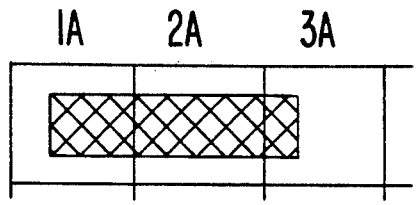
FIG. 7 shows diagrammatically a moving object straddling three search blocks.
Figure 7:
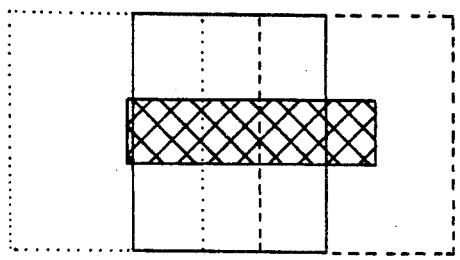
Figure 8:
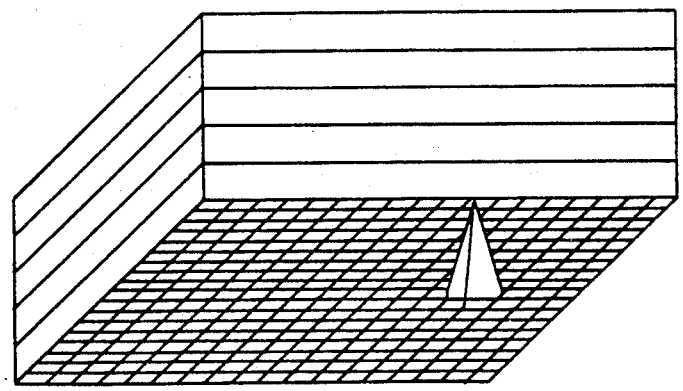
FIGS. 8 to 10 show three resulting correlation surfaces, respectively.
Figure 9:
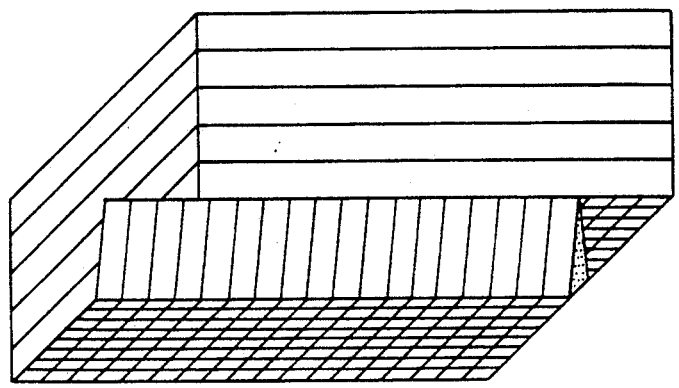

FIG. 7 shows an object with motion vectors (5, 0) straddling three search blocks 1A, 2A and 3A in a frame (t). When the search blocks 1A and 3A are correlated with respective search areas (1B and 3B) in the next frame (t+1) a correlation surface shown in FIG. 8 results showing a minimum at (5, 0). (This assumes a noiseless video source.) However, when the search block 2A is correlated with its respective search area 2B, the correlation surface shown in FIG. 9 is produced, in which the search block 2A correlates with the search area 2B at every point in the y-axis direction. There is therefore no single minimum in the correlation surface, and hence the motion between the search block 2A and the search area 2B cannot be determined.

Figure 10:
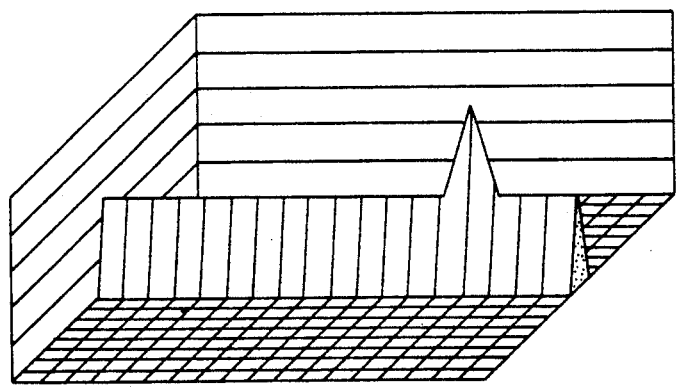

However, now consider the situation if the search block 2A is grown such that it encompasses all three of the original search blocks 1A, 2A and 3A. When the grown search block 2A is correlated with a search area covering the original search areas 1B, 2B and 3B, the resulting correlation surface is as shown in FIG. 10. This shows a single minimum at (5, 0) indicating the correct motion of the original search block 2A. This example illustrates the need for some unique feature in the source video, in order accurately to detect motion. Thus, the search blocks 1A and 3A both had unique vertical and horizontal features, that is the edges of the object, and hence motion could be determined. In contrast, the search block 2A had a unique vertical feature, but no unique horizontal feature, and hence horizontal motion could not be determined. However, by growing the search block until it encompasses a unique feature both horizontally and vertically, the complete motion for that search block can be determined. Moreover, it can be shown that growing the search block is beneficial when noise in the source video is considered.

Figure 11:
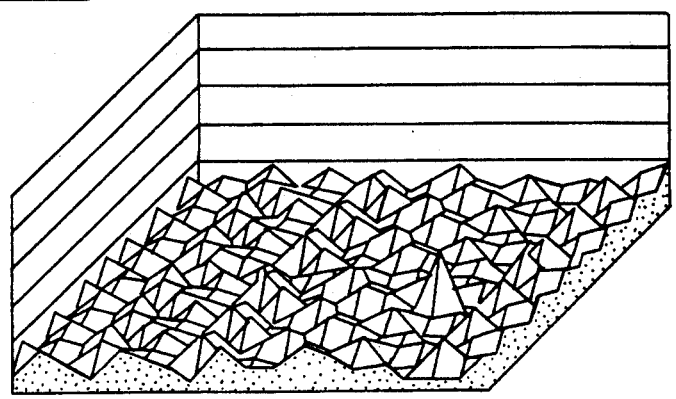
FIGS. 11 and 12 show further examples of correlation surfaces, used in describing a threshold test.
Figure 12:
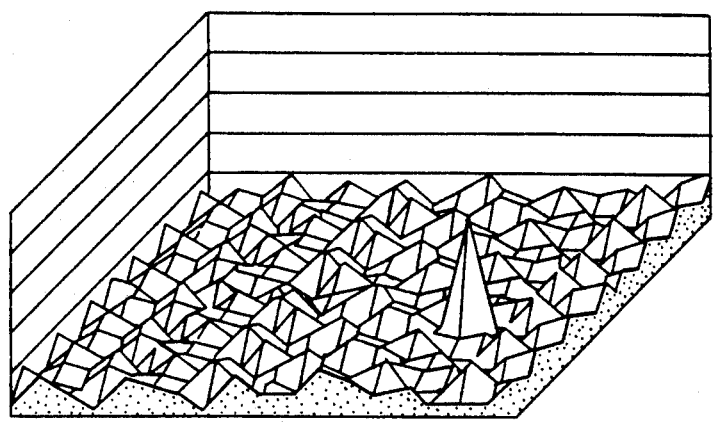

A further example will now be considered with reference to FIG. 11. This shows a correlation surface for a search block where the motion vector is (5, 3). However, due to the numerous other correlations which have taken place between the search block and the search area, the true motion is difficult to detect. An example of source video which might produce such a correlation surface would be a low contrast tree moving with the wind. It is now assumed that the search block and the search area are grown. The growing can take place in the horizontal direction, as in the previous example, or in the vertical direction, or in both directions. Assuming that the neighbouring search blocks have the same motion, the mean effect on the resulting correlation surface will be to increase the magnitude of the minima at (5, 3) by a greater proportion than the magnitude of the other correlation peaks. This is shown in FIG. 12, which indicates that it is then easier to detect the correct motion vector.

The way in which search blocks are grown will now be further considered with reference to FIG. 7. Here it was required to grow the area of the search block 2A to encompass the areas of the search blocks 1A and 3A, and to produce the resulting correlation surface. In fact, the resulting correlation surfaces are produced directly by adding together the elements of the three correlation surfaces corresponding to the search blocks 1A, 2A and 3A. In effect, if each correlation surface is considered as a matrix of point magnitudes, then the correlation surface of the enlarged search block 2A is the matrix addition of the correlation surface of the original search blocks 1A, 2A and 3A.

The area of the search block 2A could also be grown vertically by adding correlation surfaces of the search blocks above and below. whilst if the search block 2A is to be grown both horizontally and vertically, then the four neighbouring diagonal correlation surfaces have to be added as well. From this it will be seen that the actual process of growing a search block to encompass neighbouring search blocks is relatively easy, the more difficult process being to decide when growing should take place, and which neighbouring search blocks should be encompassed. Basically, the answer is that the area of the search blocks should be grown until a good minimum or good motion vector is detected. It is therefore necessary to specify when a motion vector can be taken to be a good motion vector, and this can in fact be deduced from the examples given above.

In the example described with reference to FIGS. 7 to 10, it was necessary to grow the search block horizontally in order to encompass a unique horizontal feature of the object, and hence obtain a single minimum. This situation was characterized by a row of identical minima on the correlation surface of FIG. 9, and a single minimum on the correlation surface of FIG. 10. From this the first criteria for a good minimum can be obtained; a good minimum is the point of smallest magnitude on the correlation surface for which the difference between it and the magnitude of the next smallest point exceeds a given value. This given value is known as the threshold value, and hence this test is referred to herein as the threshold test.

It should be noted that the next smallest point is prevented from originating from within the bounds of a further test, described below, and referred to herein as the rings test. In the case of a rings test employing three rings, the next smallest point is prevented from originating from a point within three pixels of the point in question. In the example of FIGS. 7 to 10, the correlation surface of FIG. 9 would have failed the threshold test; the search area 2A is therefore grown and, given a suitable threshold value, the correlation surface of FIG. 10 will pass the threshold test.

The threshold test can also be used to cause growing in the example described above with reference to FIGS. 11 and 12. Prior to growing the search block, the correct minimum is undetectable, due to the closely similar magnitudes of the surrounding points. Given a suitable threshold value, however, the correlation surface will fail the threshold test, and the search block will be grown. As a result, it will then be possible to detect the minimum among the other spurious points.

It will be seen that the use of a threshold is a subjective test, but the correct threshold for the correlation surface under test can be selected by normalizing the threshold as a fraction of the range of magnitudes within the correlation surface. This also lessens the effect of, for example the contrast of the video source.

Figure 13:
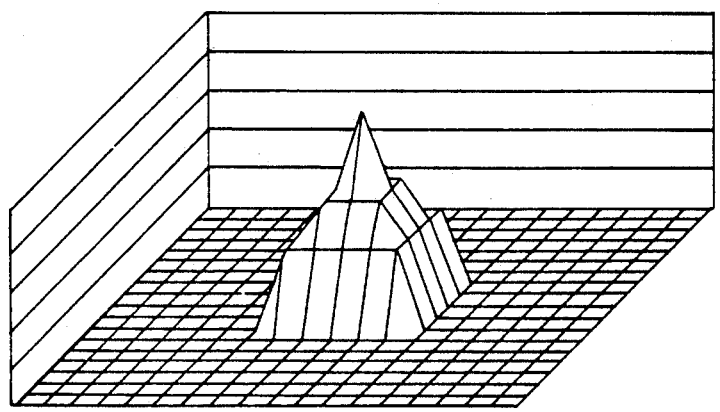
FIGS. 13 and 14 show still further examples of correlation surfaces, used in describing a rings test.
Figure 14:
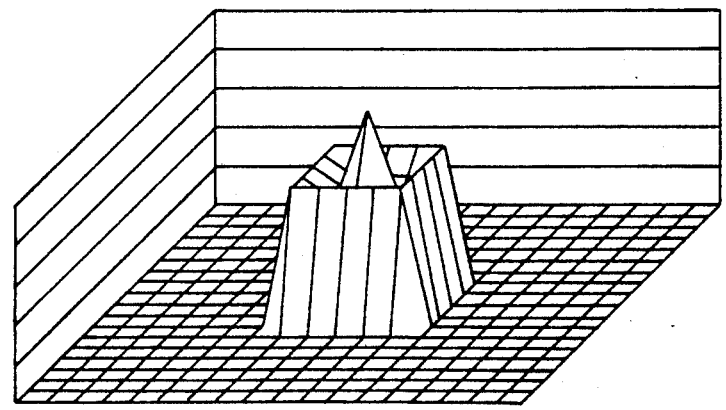

The rings test, referred to briefly above, and which is far less subjective, will now be further described. The basis of the rings test is to assume that a good minimum (or maximum) will have points of increasing (or decreasing) magnitudes surrounding it. FIG. 13 illustrates this assumption, showing a minimum at (0, 0) where the surrounding three rings of points have decreasing mean magnitude. This is as opposed to the correlation surface shown in FIG. 14, where the rings, and in particular the second inner-most ring, are not of decreasing mean magnitude.

In this case the criteria for a good minimum as defined by the rings test, is that the average slope is monotonic. Therefore for a pre-defined number of rings of points surrounding the minimum in question, the mean magnitude of each ring when moving from the inner-most ring outwards, must be greater than that of the previous ring. Returning again to the example described with reference to FIGS. 7 to 10, it will be seen from FIGS. 9 and 10 that the correlation surface of FIG. 9 would have failed the rings test, but that the correlation surface of FIG. 10 would have passed the rings test. Since the rings test compares mean, and not absolute, magnitudes, it is far less subjective than the threshold test, and indeed the only variable in the rings test is the number of rings considered.

Having described the mechanism for growing a search block, it is now necessary to consider how by examining the shape of the correlation surface it is possible to determine the most effective direction in which the search block should grow.

Referring again to FIG. 9, this correlation surface resulted where there was a unique vertical feature, but no unique horizontal feature. This is mirrored in the correlation surface by the minimum running horizontally across the correlation surface, due to the multiple correlations in this direction. From this it can be deduced that the search block should be grown horizontally. Conversely, should a line of multiple correlations run vertically, this would indicate the need to grow the search block vertically, whilst a circular collection of multiple correlations would indicate a need to grow the search block both horizontally and vertically.

Using this criteria, a quantative measure of the shape of the correlation surface is required in order to determine in which direction the search block should be grown. This measure is determined as follows. Firstly, a threshold is determined. Any point on the correlation surface below the threshold is then considered. This threshold, like that used in the threshold test, is normalized as a fraction of the range of magnitudes within the correlation surface. Using this threshold, the points on the correlation surface are examined in turn in four specific sequences. In each, the point at which the correlation surface value falls below the threshold is noted. These four sequences are illustrated diagrammatically in FIG. 15 in which the numbers 1, 2, 3 and 4 at the top, bottom, left and right refer to the four sequences, and the hatched area indicates points which fall below the threshold:

Sequence 1
  Search from the top of the correlation surface down for a point A which falls below the threshold.
Sequence 2
  Search from the bottom of the correlation surface up for a point C which falls below the threshold.
Sequence 3
  Search from the left of the correlation surface to the right for a point D which falls below the threshold.
Sequence 4

Search from the right of the correlation surface to the left for a point B which falls below the threshold.

Figure 15:
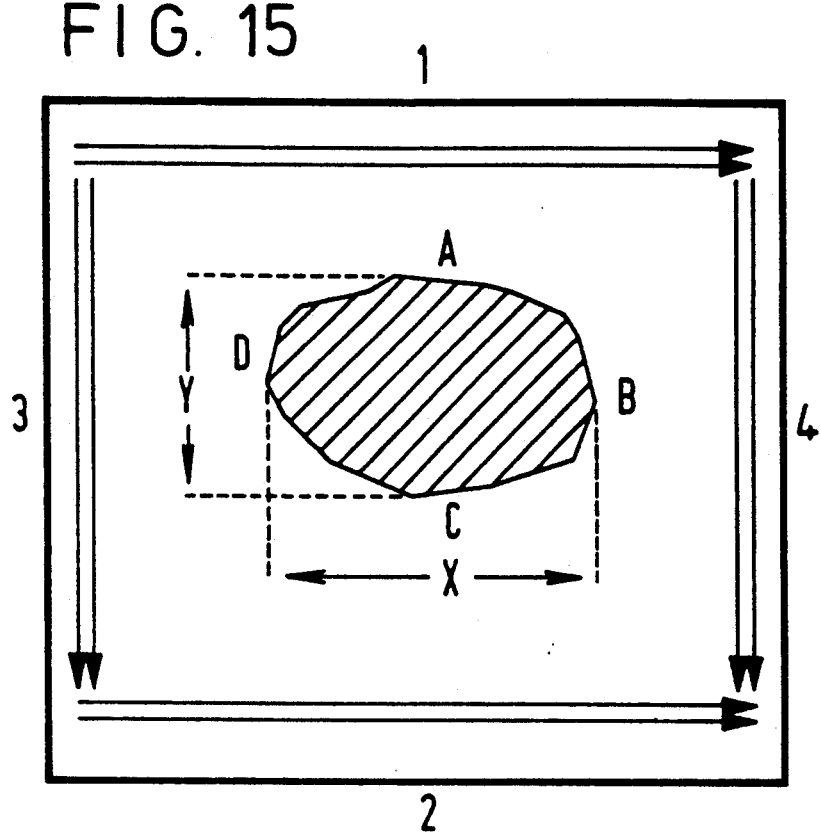
FIG. 15 shows diagrammatically how the direction in which a search block is to grow is determined.

The locations of the four resulting points A, 8, C and D are used to calculate the two dimensions X and Y indicated in FIG. 15, these dimensions X and Y indicating the size of the hatched area containing the points falling below the threshold value. Hence from the dimensions X and Y, it can be deduced whether the shape is longer in the x rather than the y direction, or vice versa, or whether the shape is approximately circular. A marginal difference of say ten percent is allowed in deducing the shape, that is, the dimension X must be a minimum of ten percent greater than the dimension Y for the shape to be considered to be longer in the x direction. Similarly for the y direction. If the dimensions X and Y are within ten percent of each other, then the shape is considered to be circular, and the search block is grown in both directions. In the example of FIG. 15 the dimension X is greater than the dimension Y, and hence the search block is grown in the x or horizontal direction.

The growing of the search block continues until one or more growth limitations is reached. These limitations are: that the minimum in the correlation surface passes both the threshold test and the rings test; that the edge of the video frame is reached; or that the search block has already been grown a predetermined number of times horizontally and vertically. This last limitation is hardware dependent. That is to say, it is limited by the amount of processing that can be done in the available time. In one specific embodiment of apparatus according to the present invention, this limit was set at twice horizontally and once vertically.

If the minimum in the correlation surface passes both the threshold test and the rings test, then it is assumed that a good motion vector has been determined, and can be passed to the motion vector reducer 5 (FIG. 1). However, if the edge of the frame is reached or the search block has already been grown a predetermined number of times both horizontally and vertically, then it is assumed that a good motion vector has not been determined for that particular search block, and instead of attempting to determine a good motion vector, the best available motion vector is determined by weighting.

The correlation surface is weighted such that the selection of the best available motion vector is weighted towards the stationary, that is the centre, motion vector. This is for two reasons, firstly, if the search block, even after growing, is part of a large plain area of source video, it will not be possible to detect a good motion vector. However, since the source video is of a plain area, a stationary motion vector will lead to the correct results in the subsequent processing. Secondly, weighting is designed to reduce the possibility of a seriously wrong motion vector being passed to the motion vector reducer 5 (FIG. 1). This is done because it is assumed that when a good motion vector cannot be determined, a small incorrect motion vector is preferable to a large incorrect motion vector.

Figure 16:
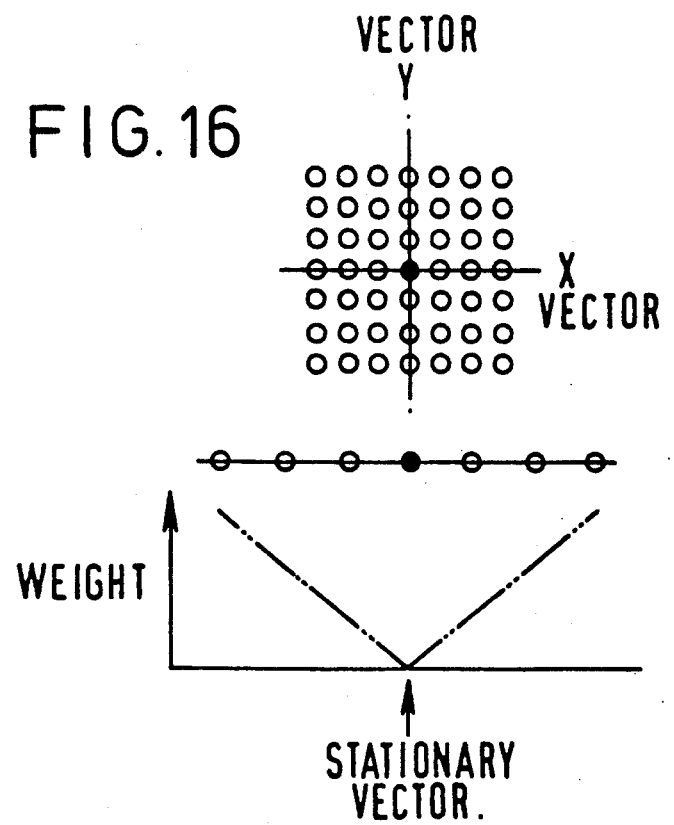
FIG. 16 shows diagrammatically how a correlation surface is weighted.

FIG. 16 shows an example of how the weighting function can be applied to the correlation surface. In this example, the weight applied to a given point on the correlation surface is directly proportional to the distance of that point from the stationary, centre motion vector. The magnitude of the point on the correlation surface is multiplied by the weighting factor. For example, the gradient of the weighting function may be such that points plus or minus 32 pixels from the centre, stationary motion vector are multiplied by a factor of three. In other words, as shown in FIG. 16, where the centre, stationary motion vector is indicated by the black circle, the weighting function is an inverted cone which is centred on the centre, stationary motion vector.

After the correlation surface has been weighted, it is again passed through the threshold test and the rings test. If a minimum which passes both these tests is determined, then it is assumed that this is a good motion vector, and it is flagged to indicate that it is a good motion vector, but that weighting was used. This flag is passed, together with the motion vector to the motion vector reducer 5 (FIG. 1). If on the other hand, neither a good motion vector nor a best available motion vector can be determined, even after weighting, then a flag is set to indicate that any motion vector passed to the motion vector reducer 5 (FIG. 1) for this search block is a bad motion vector. It is necessary to do this because bad motion vectors must not be used in the motion vector reduction process, but must be substituted as will be described below.

Thus, in summary, the operation of the motion vector estimator 4 (FIG. 1) is to derive from the correlation surface generated by the direct block matcher 3 (FIG. 1), the point of best correlation, that is the minimum. This minimum is then subjected to the threshold test and the rings test, both of which the minimum must pass in order for it to be considered to represent the motion of the search block. It should, incidentally, be noted that the threshold used in the threshold test and the rings test may be either absolute values or fractional values. If the minimum fails either test, then the search block is grown, a new minimum is determined, and the threshold test and the rings test re-applied. The most effective direction in which to grow the search block is determined from the shape of the correlation surface.

Referring initially to FIG. 1, the process of motion vector reduction will now be described. Using a HDVS, each search block is assumed to be 32 pixels by 23 lines, which can be shown to lead to a possible maximum of 2451 motion vectors. The choice of the search block size is a compromise between maintaining resolution and avoiding an excessive amount of hardware. If all these motion vectors were passed to the motion vector selector 6, the task of motion vector selection would not be practicable, due to the amount of processing that would be required. To overcome this problem, the motion vector reducer 5 is provided between the motion vector estimator 4 and the motion vector selector 6. The motion vector reducer 5 takes the motion vectors that have been generated by the motion vector estimator 4 and presents the motion vector selector 6 with only, for example, four motion vectors for each search block in the frame, including those in border regions, rather than all the motion vectors derived for that frame. The effect of this is two-fold. Firstly, this makes it much easier to choose the correct motion vector, so long as it is within the group of four motion vectors passed to the motion vector selector 6. Secondly, however, it also means that if the correct motion vector is not passed as one of the four, then the motion vector selector 6 is not able to select the correct one. It is therefore necessary to try to ensure that the motion vector reducer 5 includes the correct motion vector amongst those passed to the motion vector selector 6. It should also be mentioned that although four motion vectors are passed by the motion vector reducer 5 to the motion vector selector 6, only three of these actually represent motion, the fourth motion vector always being the stationary motion vector which is included to ensure that the motion vector selector 6 is not forced into applying a motion vector representing motion to a stationary pixel. Other numbers of motion vectors can be passed to the motion vector selector 6, for example, in an alternative embodiment four motion vectors representing motion and the stationary motion vector may be passed.

Hereinafter the term 'sample block' refers to a block in a frame of video in which each pixel is offered the same four motion vectors by the motion vector reducer 5. Thus, a sample block is the same as a search block before the search block has been grown, and in a frame of video the initial positions of the sample blocks and the search blocks are the same.

The motion vector reducer 5 (FIG. 1) receives the motion vectors and the flags from the motion vector estimator 4 (FIG. 1) and determines the quality of the motion vectors by examining the flags. If the motion vector was not derived from an ambiguous surface, that is there is a high degree of confidence in it, then it is termed a good motion vector, but if a certain amount of ambiguity exists, then the motion vector is termed a bad motion vector. In the motion vector reduction process, all motion vectors classed as bad motion vectors are ignored, because it is important that no incorrect motion vectors are ever passed to the motion vector selector 6 (FIG. 1), in case a bad motion vector is selected thereby. Such selection would generally result in a spurious dot in the final picture, which would be highly visible.

Each of the motion vectors supplied to the motion vector reducer 5 (FIG. 1) was obtained from a particular search block, and hence a particular sample block, the position of these being noted together with the motion vector. Because any motion vectors which have been classed as bad motion vectors are ignored, not all sample blocks will have a motion vector derived from the search block at that position. The motion vectors which have been classed as good motion vectors, and which relate to a particular search block, and hence a particular sample block, are called local motion vectors, because they have been derived in the area from which the sample block was obtained. In addition to this, another motion vector reduction process counts the frequency at which each good motion vector occurs, with no account taken of the actual positions of the search blocks that were used to derive them. These motion vectors are then ranked in order of decreasing frequency, and are called common motion vectors. In the worst case only three common motion vectors are available and these are combined with the stationary motion vector to make up the four motion vectors to be passed to the motion vector selector 6 (FIG. 1). However, as there are often more than three common motion vectors, the number has to be reduced to form a reduced set of common motion vectors referred to as global motion vectors.

A simple way of reducing the number of common motion vectors is to use the three most frequent common motion vectors and disregard the remainder. However, the three most frequent common motion vectors are often those three motion vectors which were initially within plus or minus one pixel motion of each other vertically and/or horizontally. In other words, these common motion vectors were all tracking the same motion with slight differences between them, and the other common motion vectors, which would have been disregarded, were actually tracking different motions.

In order to select the common motion vectors which represent all or most of the motion in a scene, it is necessary to avoid choosing global motion vectors which represent the same motion. Thus, the strategy actually adopted is first to take the three most frequently occurring common motion vectors and check to see if the least frequent among them is within plus or minus one pixel motion vertically and/or plus or minus one pixel motion horizontally of either of the other two common motion vectors. If it is, then it is rejected, and the next most frequently occurring common motion vector is chosen to replace it. This process is continued for all of the most frequently occurring common motion vectors until there are either three common motion vectors which are not similar to each other, or until there are three or less common motion vectors left. However, if there are more than three common motion vectors left, then the process is repeated this time checking to see if the least frequent among them is within plus or minus two pixel motion vertically and/or plus or minus two pixel motion horizontally of another, and so on at increasing distances if necessary. These three common motion vectors are the required global motion vectors, and it is important to note that they are still ranked in order of frequency.

Figures 17, 18:
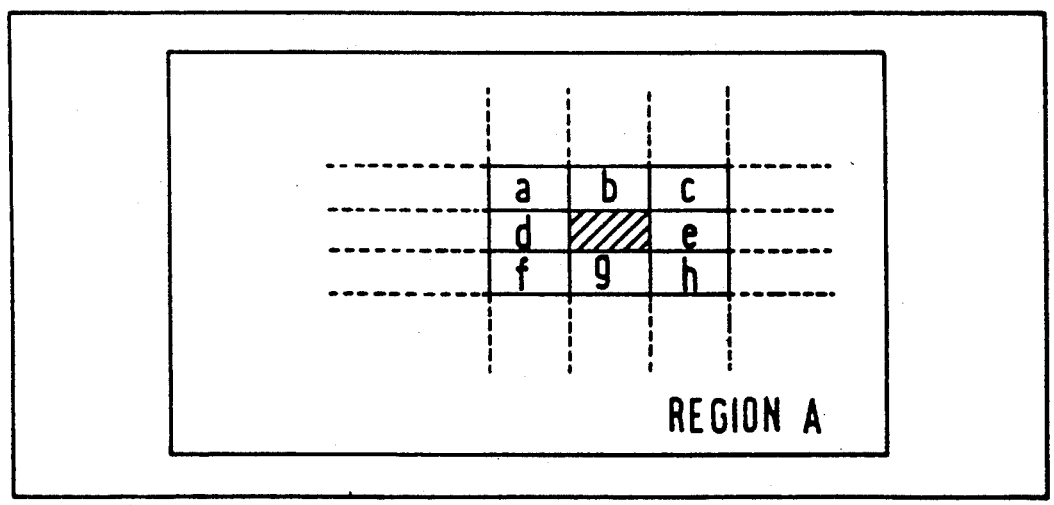
FIG. 17 shows motion vector regions in a frame of video.
FIGS. 18 to 20 show diagrams used in explaining motion vector reduction in respective regions of a frame of video.

When considering the motion vector reduction process and the sample blocks of a frame of video, it is necessary to look at three different types of sample blocks. These types are related to their actual position in a frame of video, and are shown in FIG. 17 as regions. Region A comprises sample blocks which are totally surrounded by other sample blocks and are not near the picture boundary. Region B contains sample blocks which are partially surrounded by other sample blocks and are not near the picture boundary. Finally, region C contains sample blocks which are near the picture boundary. The motion vector reduction algorithm to be used for each of these regions is different. These algorithms will be described below, but firstly it should be reiterated that there exist good motion vectors for some of the sample blocks in the frame of video, and additionally there are also three global motion vectors which should represent most of the predominant motion in the scene. A selection of these motion vectors is used to pass on three motion vectors together with the stationary motion vector for each sample block.

FIG. 18 illustrates diagrammatically motion vector reduction in the region A. This is the most complex region to deal with, because it has the largest number of motion vectors to check. FIG. 18 shows a central sample block which is hatched, surrounded by other sample blocks a to h. Firstly, the locally derived motion vector is examined to see if it was classed as a good motion vector. If it was, and it is also not the same as the stationary motion vector, then it is passed on. However, if it fails either of these tests, it is ignored. Then the motion vector associated with the sample block d is checked to see if it was classed as a good motion vector. If it was, and if it is neither the same as any motion vector already selected, nor the same as the stationary motion vector, then it too is passed on. If it fails any of these tests then it too is ignored. This process then continues in a similar manner in the order e, b, g, a, h, c and f. As soon as three motion vectors, not including the stationary motion vector, have been obtained, then the algorithm stops, because that is all that is required for motion vector selection for that sample block. It is, however, possible for all the above checks to be carried out without three good motion vectors having been obtained. If this is the case, then the remaining spaces are filled with the global motion vectors, with priority being given to the more frequent global motion vectors.

Figure 19:
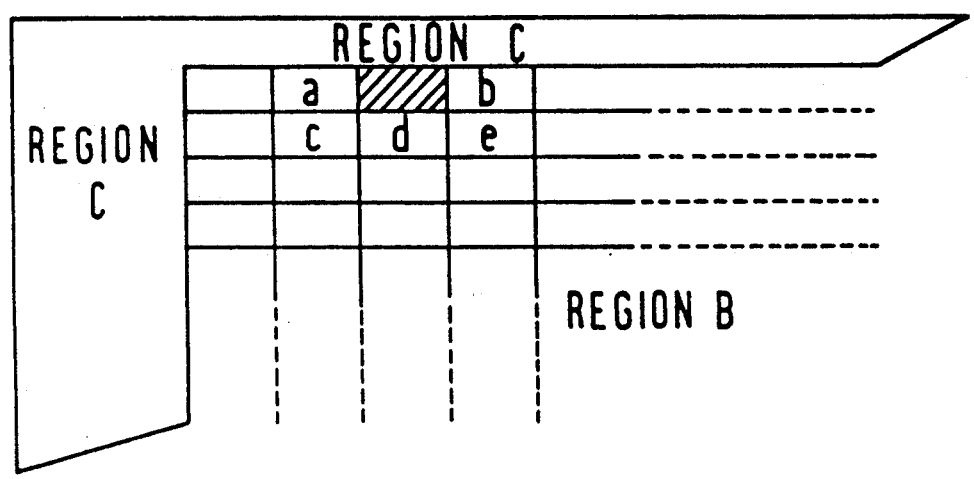

FIG. 19 illustrates motion vector reduction in the region B. Sample blocks in the region B are the same as those in the region A, except that they are not totally surrounded by other sample blocks. Thus the process applied to these sample blocks is exactly the same as those for the region A, except that it is not possible to search in all the surrounding sample blocks. Thus as seen in FIG. 19, it is only possible to check the motion vectors for the sample blocks a to e, and any remaining spaces for motion vectors are filled, as before, with global motion vectors. Likewise, if the hatched sample block in FIG. 19 were displaced two positions to the left, then it will be seen that there would only be three adjacent surrounding blocks to be checked before resorting to global motion vectors.

Figure 20:
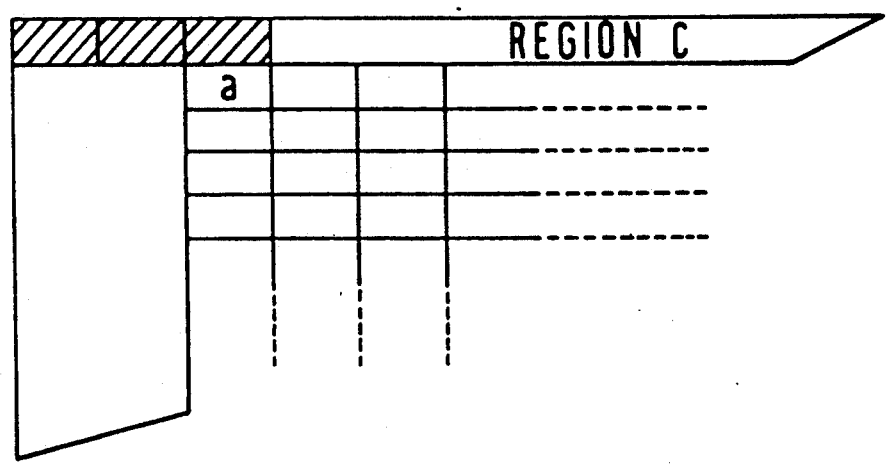

FIG. 20 illustrates motion vector reduction in the region C. This is the most severe case, because the sample blocks neither have a locally derived motion vector nor do they have many surrounding sample blocks whose motion vectors could be used. The simplest way of dealing with this problem is simply to give the sample blocks in the region C the global motion vectors together with the stationary motion vector. However, this is found to produce a block-like effect in the resulting picture, due to the sudden change in the motion vectors presented for the sample blocks in the region C compared with adjoining sample blocks in the region B. Therefore a preferred strategy is to use for the sample blocks in the region C the sample motion vectors as those used for sample blocks in the region B, as this prevents sudden changes. Preferably, each sample block in the region C is assigned the same motion vectors as that sample block in the region B which is physically nearest to it. Thus, in the example of FIG. 20, each of the hatched sample blocks in the region C would be assigned the same motion vectors as the sample block a in the region B, and this has been found to give excellent results.

Referring again to FIG. 1, the purpose of the motion vector selector 6 is to assign one of the four motion vectors supplied thereto to each individual pixel within the sample block. In this way the motion vectors can be correctly mapped to the outline of objects. The way in which this assignment is effected is particularly intended to avoid the possibility of the background surrounding fine detail from producing a better match than that produced by the correct motion vector.

Figure 21:
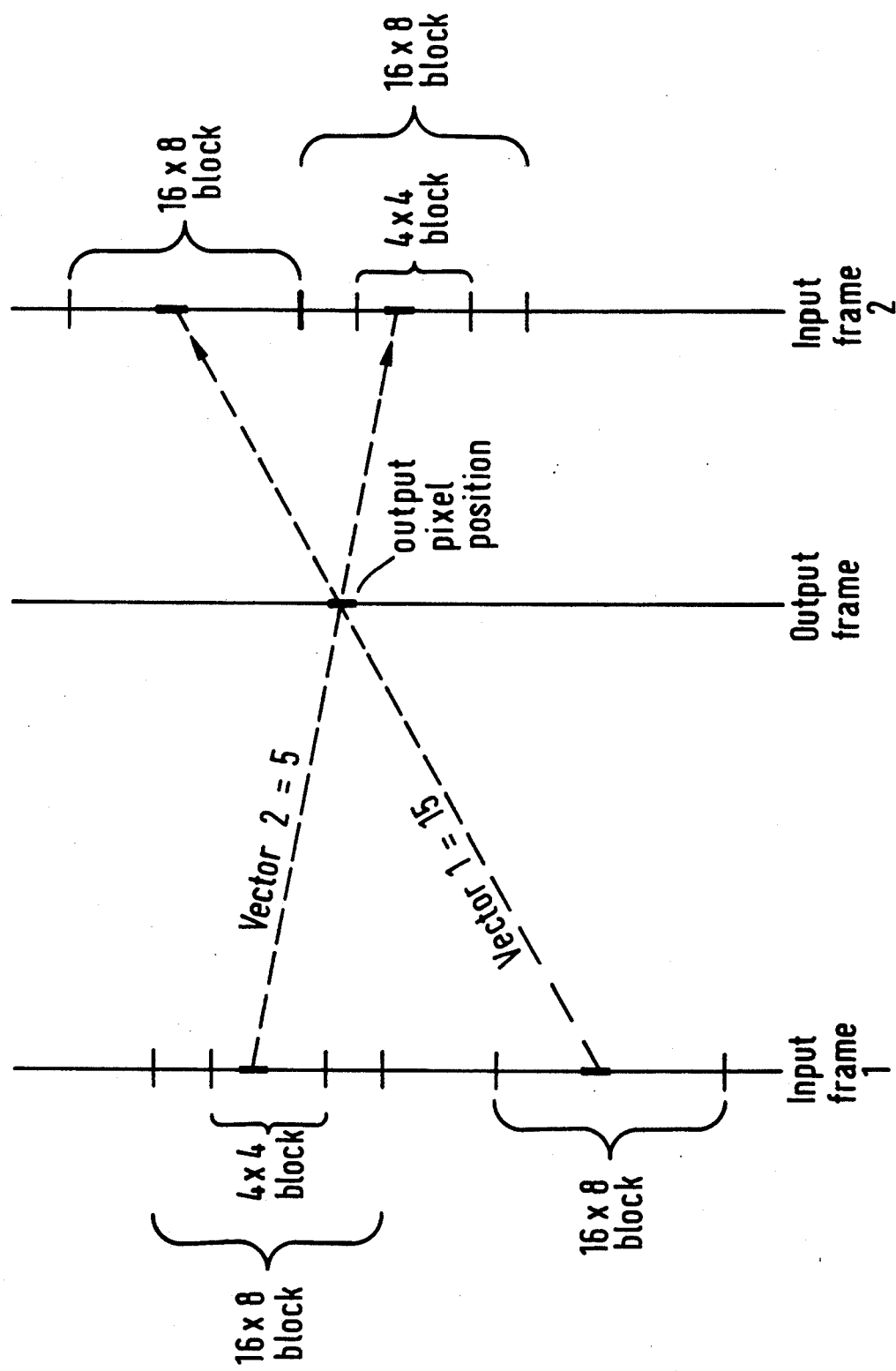
FIG. 21 shows diagrammatically a method of motion vector selection in accordance with the present invention.

Referring to FIG. 21, the motion vector selection makes use of two frames of motion vectors. One frame of motion vectors (input frame 1) is considered to be the reference frame, and the following frame to this (input frame 2) is also used. The output frame position then exists somewhere between the two input frames of motion vectors. For each output pixel position in the output frame the four possible motion vectors are tested. A line drawn through the output pixel position at the angle of the motion vector being tested will point to a position on the input frame 1 and a position on the input frame 2.

For motion vectors of all magnitudes up to the maximum possible, which in the present embodiment is sixteen pixel lengths, blocks of sixteen pixels horizontally by eight pixels vertically having as centres the positions pointed to on the input frame 1 and on the output frame 2, respectively, are acquired for comparison. This is indicated in FIG. 21 for the vector 1, assumed to be of magnitude fifteen pixel lengths. The comparison is effected by differencing the luminance values of the correspondingly positioned pixels in the two blocks and summing the resulting differences to obtain a sum of absolute differences between the two blocks. This is repeated for each of the four motion vectors, each of which will of course point to a different pair of positions on the input frames 1 and 2, and hence result in different blocks for comparison. The smallest of the four sums of absolute difference so derived indicates which of the four motion vectors gives the most accurate result for the output pixel position, and that motion vector is passed forward to the motion vector post processor 7 {FIG. 1}. This is conveniently done by numbering the motion vectors 1 to 4 and identifying them by number except where they are actually to be used.

For motion vectors of all magnitudes up to some selected value, this process is modified as will shortly be described. In the present embodiment the selected value is eight pixel lengths, which happens to be half the maximum possible magnitude, but some different value could be selected.

The purpose of the modification is to prevent fine detail being lost by the use of the large (sixteen pixels by eight pixels) blocks, particularly where the motion is small, and the effect is to add weighting in the case of motion vectors of relatively small magnitude.

To achieve this, formation vectors of all magnitudes up to eight pixel lengths, blocks of four pixels horizontally by four pixels vertically having as centres the positions pointed to on the input frame 1 and on the input frame 2, respectively, are acquired for comparison, in addition to the sixteen pixels by eight pixels blocks referred to above. This is indicated in FIG. 21 for the vector 2, assumed to be of magnitude five pixel lengths. In the cases of these motion vectors the sum of absolute differences is derived as the sum of absolute differences for the smaller blocks (4×4) and the sum of absolute differences for the larger blocks (16×8), and the resulting sum of absolute differences is normalized (multiplied by 16×8 and divided by 16×8 plus 4×4) to permit level comparison with any sum first described.

The block sizes (16×8 and 4×4) are of course not critical, and can be varied to suit particular standards conversions or particular material to be converted.

Figure 22:
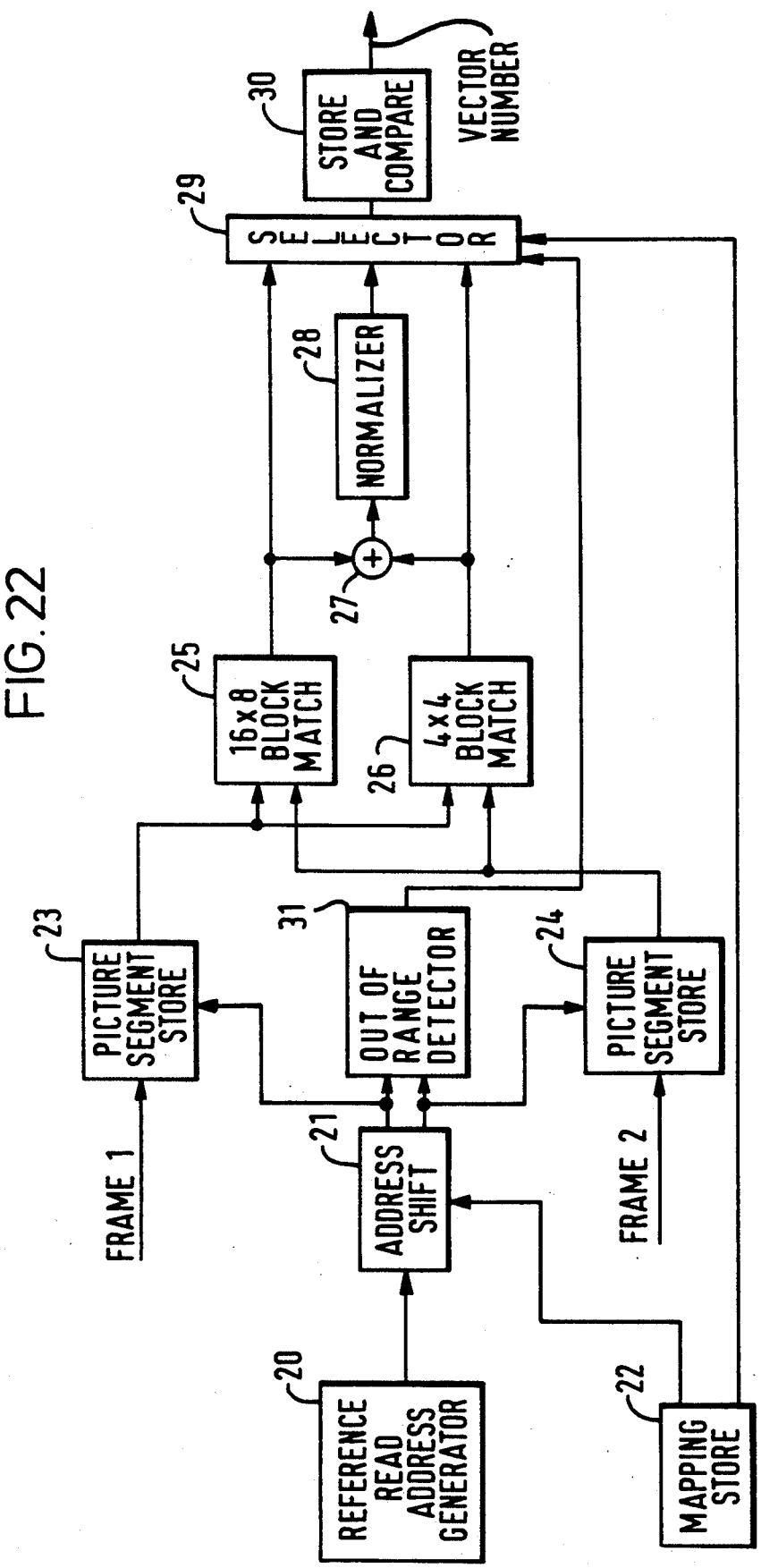
FIG. 22 shows part of the embodiment in more detailed block diagrammatic form.

The form of the motion vector selector 6 (FIG. 1) will now be described in more detail with reference to FIG. 22. For convenience of hardware implementation and to achieve the required operating speed, which in the present case is real time, the circuitry shown in FIG. 22 is replicated twenty-four times. Thus each frame is divided into twelve strips (segments) for processing, and the frame repetition rate is twenty-five per second, so to process fifty frames per second, replication 2×12 times is required.

The circuit arrangement of FIG. 22 comprises a reference read address generator 20, an address shift circuit 21, a mapping store 22, picture segment stores 23 and 24, block matchers 25 and 26, an adder 27, a normalizer 28, a selector 29, a store and comparison device 30, and an out of range detector 31, interconnected as shown and operating as will now be described.

First a corresponding segment of input frame 1 and input frame 2 is acquired in the picture segment stores 23 and 24 respectively, each segment being sufficiently more than one twelfth the number of lines in the frame to provide the overlap required in processing the blocks. As soon as the segments have been stored, the block matchers 25 and 26 start deriving the sums of absolute differences as described above, for each of the four motion vectors which have been stored in the mapping store 22. For convenience of operation both sums of absolute differences are derived from all magnitudes of motion vectors. Each respective sum of absolute differences derived by the block matcher 25 and 26 is supplied directly to the selector 29, and the sum of absolute differences derived by the block matchers 25 and 26, added by the adder 27, and normalized by the normalizer 28 is likewise supplied to the selector 29, which selects which sum of absolute differences to supply to the store and comparison device 30 in dependence on a control signal supplied by the mapping store 22, and indicating whether the relevant motion vector is above or below the selected value.

For each group of four motion vectors the store and comparison device 30 stores the sum of absolute differences corresponding to the first motion vector. On receiving the sum of absolute differences corresponding to the second motion vector it compares the two and stores the lower, and so on up to the sum of absolute differences corresponding to the fourth motion vector. The minimum of the four is then supplied as an output in the form of the number of the motion vector from which the minimum sum of absolute differences was derived. This output is supplied to the motion vector post processor 7 (FIG. 1).

The purpose of the out of range detector 31 is to prevent the use in the block matchers 25 and 26 of blocks which lie wholly or partly outside the active picture region. If the larger block (16×8) overlaps or lies outside the edge of the active picture region then the smaller block (4×4) may be usable, but if the smaller block also overlaps or lies outside the edge of the active picture region then the current motion vector is rejected, because the comparison is void. This prevents an erroneous output pixel being generated.

The out of range detector 31 generates a first control signal if either or both of the larger blocks (16×8) to be compared overlaps or goes outside the active picture region, and this first control signal forces the selector 29 to use the small block (4×4). If either or both of the smaller blocks to be compared overlaps or goes outside the active picture region, then the out of range detector 31 generates a second control signal which forces the motion vector under test to be replaced by the zero motion vector.

It is possible to modify the implementation of the block matching effected by the circuit of FIG. 22, because a 16×8 block match, being the sum of 16×8 differences may be obtained by summing eight 4×4 block matches. If this is done then both the 4×4 and the 16×8 block matches can be derived from a common circuit with the addition of a delay to centralize the 4×4 block in the 16×8 block (this delay is included in the block matcher 26 of FIG. 22). An additional advantage of this modification is that it provides flexibility to use intermediate sized blocks, such as 8×4, 8×8, 12×4 or 12×8, if required.

Figure 23:
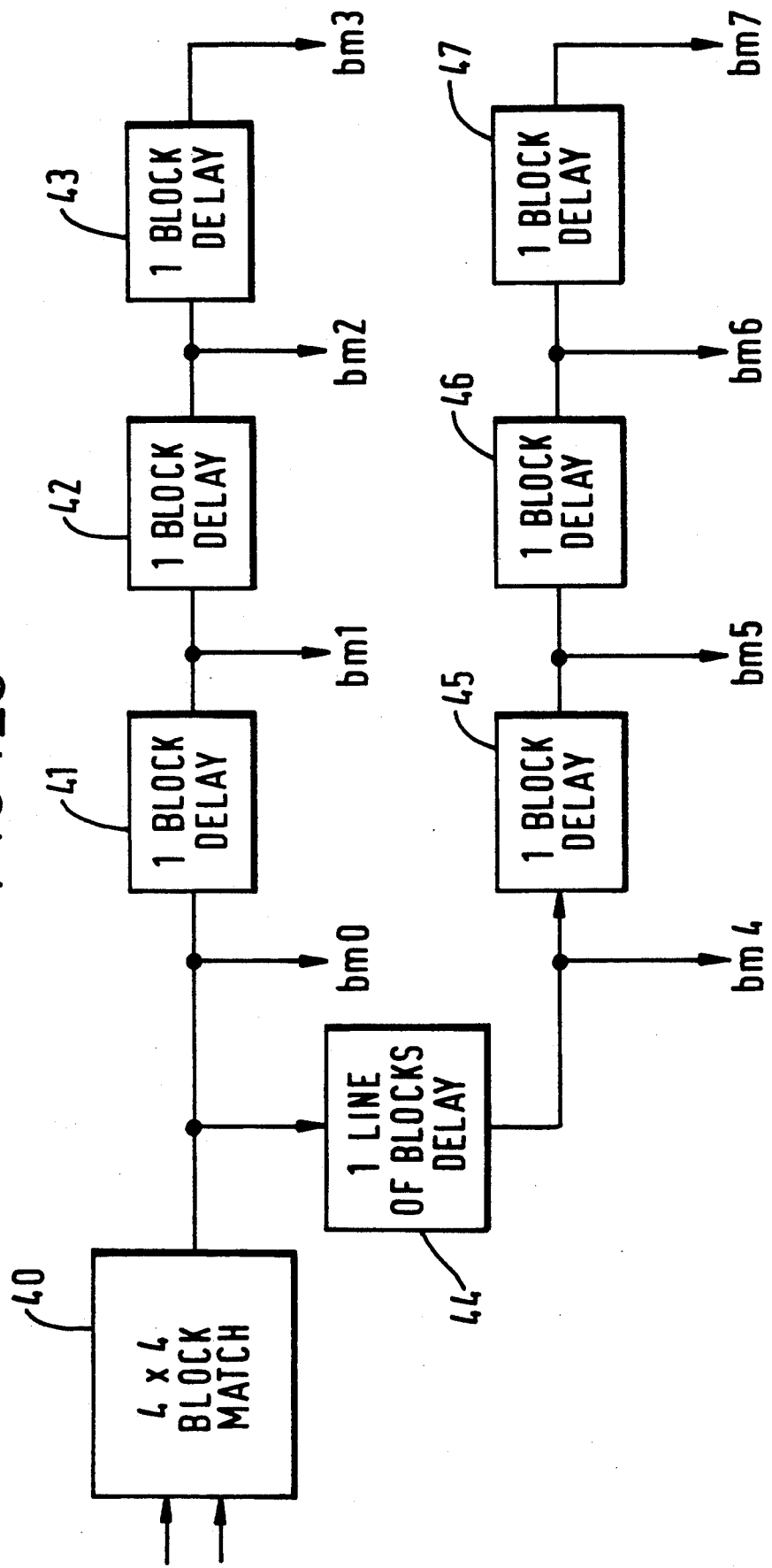
FIG. 23 shows a modification to part of the embodiment of FIG. 22.

FIG. 23 shows one way of implementing this modification. A 4×4 block matcher 40 corresponding to the block matcher 26 of FIG. 22, is connected to a seven 1-line-of-blocks delay 44 and six 1 block delays 41–43 and 45–47 which are connected as shown. A 16×8 block match can then be derived as:

$$\rho bm0. bm1, \ldots bm7.$$

Figure 24:
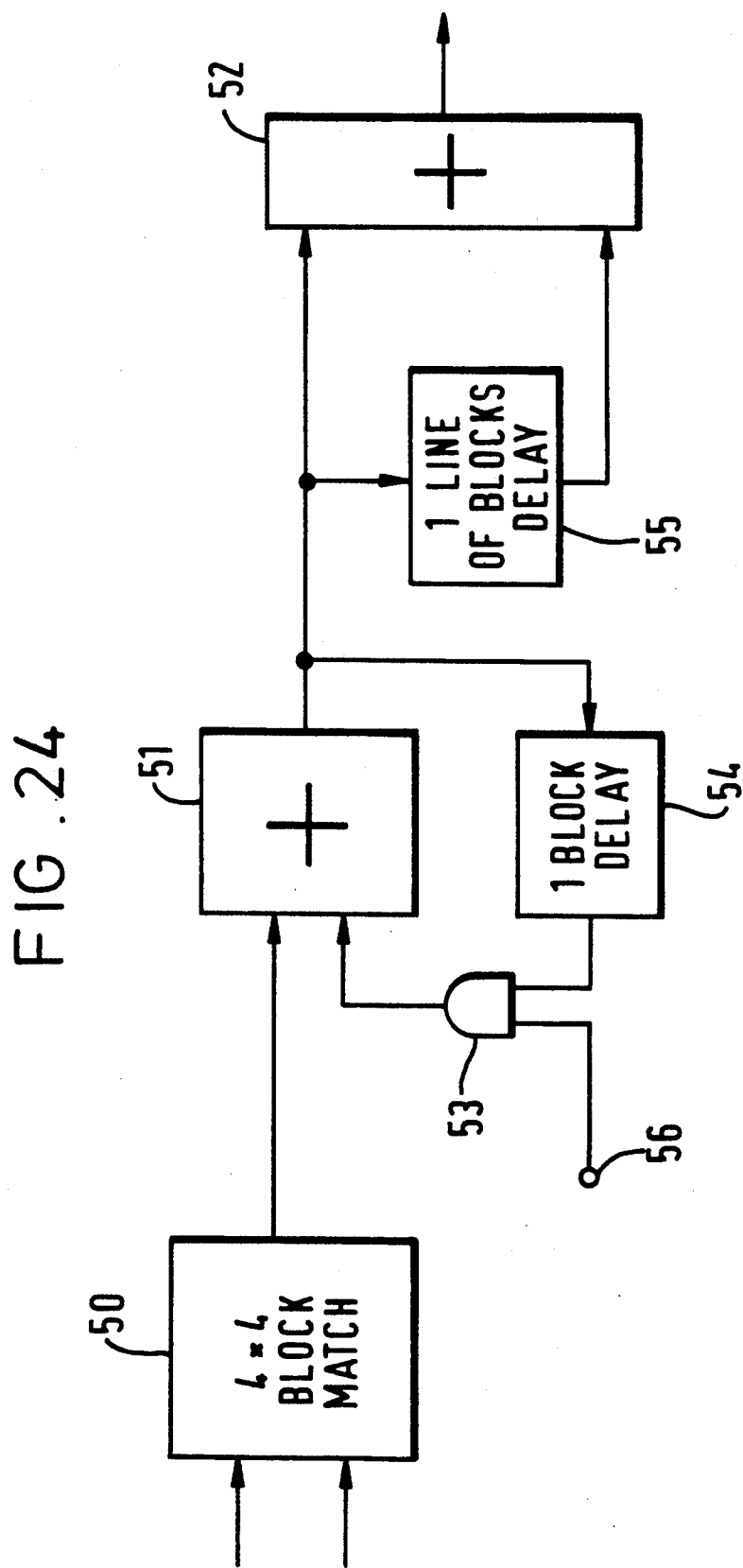
FIG. 24 shows another modification to part of the embodiment of FIG. 22.

FIG. 24 shows another, somewhat simpler way of implementing the above modification. A 4×4 block matcher 50 corresponds to the block matcher 26 of FIG. 22, and is connected to accumulators 51 and 52, a gate 53, a 1-block delay 54 and a 1-line-of-blocks delay 55 connected as shown. A gating signal is supplied via a terminal 56 to reset the accumulator 51.

Following motion vector selection, there will almost certainly be in any real picture situation, some remaining spurious motion vectors associated with certain pixels. Such spurious motion vectors are assumed to exist at a point singularity, where a single pixel has a motion vector different from those of all the surrounding pixels; at a horizontal motion vector impulse, where three horizontally aligned pixels have a motion vector different from those of the surrounding pixels; at a vertical motion vector impulse, where three vertically aligned pixels have a motion vector different from those of the surrounding pixels; at a diagonal motion vector impulse, where three diagonally aligned pixels have a motion vector different from those of all the surrounding pixels; at a horizontal plus vertical motion vector impulse, where five pixels disposed in an upright cross have a motion vector different from those of all the surrounding pixels; and at a two-diagonal motion vector impulse, where five pixels arranged in a diagonal cross have a motion vector different from those of all the surrounding pixels.

It is assumed that pixel motion vectors which fall into any of the above six categories do not actually belong to a real picture, and are a direct result in of an incorrect motion vector selection. If such motion vectors were used during the interpolation process, then they would be likely to cause dots on the final output picture, and it is therefore preferable that such motion vectors be identified and eliminated. This is done using an algorithm which will detect and flag all of the above motion vector groupings.

Having identified the bad motion vectors, it is then necessary to repair them, this also being effected by the motion vector post processor 7 (FIG. 1). Although various methods such as interpolation or majority replacement can be used, it is has been found that in practice simple replacement gives good results.

Figure 25:
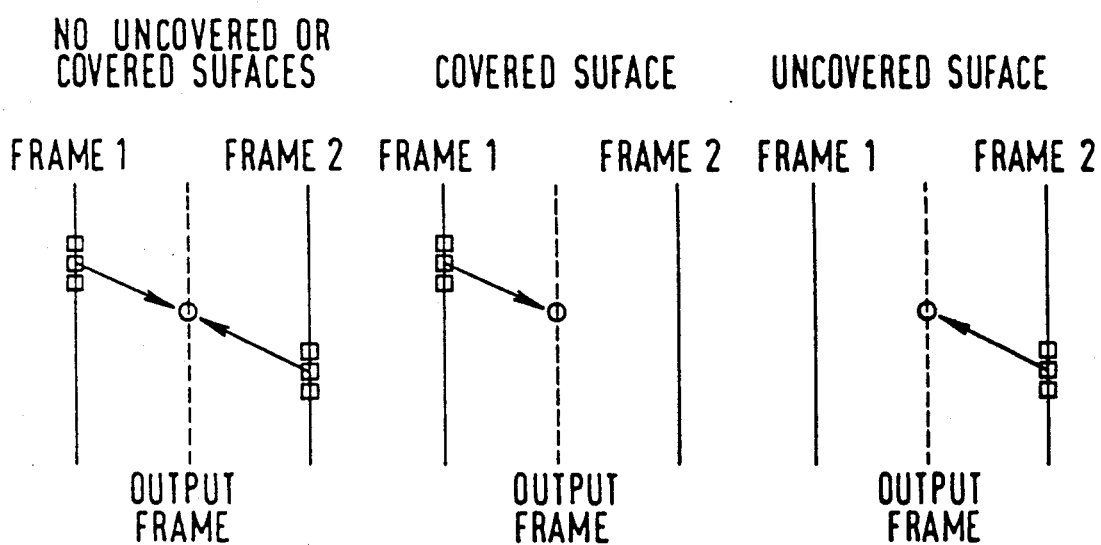
FIG. 25 shows diagrammatically the operation of an interpolator.

Referring again to FIG. 1, the finally selected motion vector for each pixel is supplied by the motion vector post processor 7 to the interpolator 8, together with the progressive scan converted frames at 60 frames per second from the progressive scan converter 2. The interpolator 8 is of relatively simple form using only two progressive scan converted frames, as indicated in FIG. 25. Using the temporal position of the output frame relative to successive input frames, frame 1 and frame 2, and the motion vector for the pixel in the output frame, the interpolator 8 determines in known manner which part of the first frame should be combined with which part of the second frame and with what weighting to produce the correct output pixel value. In other words, the interpolator 8 adaptively interpolates along the direction of movement in dependence on the motion vectors to produce interlace scan fields corresponding to 25 frames per second. Although the motion vectors have been derived using only luminance values of the pixels, the same motion vectors are used for deriving the required output pixel chrominance values. An 8×8 array of pixels are used from each frame to produce the required output. Thus the interpolator 8 is a two-dimensional, vertical/horizontal, interpolator and the coefficients used for the interpolator 8 may be derived using the Remez exchange algorithm which can be found fully explained in 'Theory and application of digital signal processing'. Lawrence R Rabiner, Bernard Gold, Prentice-Hall Inc., pages 136 to 140 and 227.

FIG. 25 shows diagrammatically the interpolation performed by the interpolator 8 (FIG. 1) for three different cases. The first case, shown on the left, is where there are no uncovered or covered surfaces, the second case, shown in the centre, is where there is a covered surface, and the third case, shown on the right, is where there is an uncovered surface. In the case of a covered surface, the interpolation uses only frame 1, whilst in the case of an uncovered surface, the interpolation uses only frame 2.

Provision can be made in the interpolator 8 to default to non-motion compensated interpolation, in which case the temporally nearest progressive scan converted frame is used.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method of deriving motion vectors representing motion between successive fields or frames of an input video signal having a first standard format from which an output video signal having a second standard format is to be derived by motion compensated interpolation, the method including the steps of:
    deriving a plurality of motion vectors for each pixel of each field or frame of said output video signal;
    testing each of said motion vectors for each said pixel by deriving respective sums of absolute luminance differences of corresponding pixels in respective blocks of pixels in the two fields or frames of said input video signal temporally nearest the respective field or frame of said output video signal, in which the respective blocks are pointed to by the motion vector currently being tested;
    center-weighting the sum of absolute luminance differences if the corresponding motion vector being tested has a magnitude less than a predetermined value; and
    selecting, from said plurality of motion vectors, the motion vector having a minimum said sum of absolute luminance differences.

2. A method according to claim 1, wherein the step of deriving said plurality of said motion vectors includes comparing blocks of pixels in a first field or frame of said input video signal with a plurality of blocks of pixels in the following field or frame of said input video signal.

3. A method according to claim 2, wherein the step of comparing includes comparing sums of absolute differences of luminance levels of the pixels in the respective blocks being compared.

4. A method according to claim 1, wherein the step of testing each of said motion vectors includes deriving a first sum of the absolute luminance differences for the respective corresponding blocks in said two fields or frames of said input video signal which are each centered on a respective position in the field or frame pointed to by said motion vector currently being tested, in which each of said corresponding blocks extends n pixels horizontally and m pixels vertically.

5. A method according to claim 4, wherein the step of testing further includes deriving a second sum of the absolute luminance differences, when the respective magnitude of said motion vector currently being tested is less than said predetermined value, for other respective corresponding blocks in said two fields or frames of said input video signal which are each centered on the respective position in said field or frame pointed to by said motion vector currently being tested, in which each of said other blocks extends p pixels horizontally and q pixels vertically, where p is less than n and q is less than m, and wherein the step of center-weighting includes summing said second sum of the absolute luminance differences to said first sum of the absolute luminance differences for said motion vector currently being tested.

6. A method according to claim 5, wherein the step of center-weighting further includes normalizing the sum of said second sum of the absolute luminance differences and said first sum of the absolute luminance differences.

7. A motion compensated video standards converter comprising:
    means for deriving a plurality of motion vectors for each pixel of each field or frame of an output standards-converted video signal, said motion vectors representing motion between successive fields or frames of an input video signal from which said video signal is to be derived by motion compensated interpolation;
    means for testing each of said motion vectors for each said pixel by deriving respective sums of absolute luminance differences of corresponding pixels in respective blocks of pixels in the two fields or frames of said input video signal temporally nearest the respective field or frame of said output video signal, in which the respective blocks are pointed to by the motion vector currently being tested;
    means for center-weighting the sum of absolute luminance differences if the corresponding motion vector being tested has a magnitude less than a predetermined values; and
    means for selecting, from said plurality of motion vectors, the motion vector having a minimum said sum of absolute luminance differences.

8. A converter according to claim 7, wherein said converter is operable in real time.

9. A converter according to claim 7, wherein said means for deriving said motion vectors compares blocks of pixels in a first field or frame of said input video signal with a plurality of blocks of pixels in the following field or frame of said input video signal.

10. A converter according to claim 9, wherein said means for deriving said motion vectors compares said blocks of pixels in said first field or frame with said plurality of blocks of pixels in the following field or frame by comparing sums of absolute differences of luminance levels of the pixels in the respective blocks being compared.

11. A converter according to claim 7, wherein said converter forms a down converter and wherein said input video signal is a high definition video signal.

12. A converter according to claim 11, wherein said output video signal is a phase alternation line (PAL) signal having 625 lines of pixels per frame and a frequency of 50 fields per second.

13. A converter according to claim 7, wherein said means for testing derives, for each of the motion vectors tested, a first sum of the absolute luminance differences for the respective corresponding blocks in said two fields or frames of said input video signal which are each centered on a respective position in the field or frame pointed to by said motion vector currently being tested, in which each of said corresponding blocks extends n pixels horizontally and m pixels vertically.

14. A converter according to claim 13, wherein said means for testing derives a second sum of the absolute luminance differences, when the respective magnitude of said motion vector currently being tested is less than said predetermined value, for other respective corresponding blocks in said two fields or frames of said input video signal which are each centered on the respective position in said field or frame pointed to by said motion vector currently being tested, in which each of said other blocks extends p pixels horizontally and q pixels vertically, where p is less than n and q is less than m, and wherein said means for center-weighting sums said second sum of the absolute luminance differences to said first sum of the absolute luminance differences for said motion vector currently being tested.

15. A converter according to claim 14, wherein said means for center-weighting includes means for normalizing the sum of said second sum of the absolute luminance differences and said first sum of the absolute luminance differences.

16. A motion compensated video standards converter for converting an input video signal having a first format to a motion compensated video signal having a second format, said converter comprising:
  means for receiving said input video signal having said first format;
  means for deriving a plurality of motion vectors for each pixel of each field or frame of said motion compensated video signal, said motion vectors representing motion between successive fields or frames of the received video signal;
  means for generating for each of said motion vectors for each said pixel respective summations of absolute luminance differences of corresponding pixels in respective blocks of pixels contained in the two fields or frames of said received video signal temporally nearest the respective field or frame of said motion compensated video signal, in which the respective blocks are selected by the respective motion vector;
  means for weighting the sum of absolute luminance differences if the corresponding respective motion vector has a magnitude less than a predetermined value;
  means for selecting the motion vector from among said plurality of motion vectors for each said pixel of the respective field or frame of said motion compensated video signal which has a minimum value of said sum of absolute luminance differences; and
  means for interpolating said received video signal in accordance with the selected motion vectors so as to produce said motion compensated video signal.

* * * * *